(12) United States Patent
Garn et al.

(10) Patent No.: US 12,269,195 B2
(45) Date of Patent: Apr. 8, 2025

(54) PROCESS FOR MANUFACTURING A TREAD MOLDING ELEMENT OF A TIRE-MOLD COMPRISING A THERMOSETTING POLYMER

(71) Applicant: The Goodyear Tire & Rubber Company, Akron, OH (US)

(72) Inventors: Benjamin Isaiah Garn, Norton, OH (US); Marc Borowczak, Hartville, OH (US)

(73) Assignee: THE GOODYEAR TIRE & RUBBER COMPANY, Akron, OH (US)

(*) Notice: Subject to any disclaimer, the term of this patent is extended or adjusted under 35 U.S.C. 154(b) by 562 days.

(21) Appl. No.: 17/804,131

(22) Filed: May 26, 2022

(65) Prior Publication Data

US 2023/0014862 A1    Jan. 19, 2023

Related U.S. Application Data

(60) Provisional application No. 63/221,562, filed on Jul. 14, 2021.

(51) Int. Cl.
*B29C 33/38*   (2006.01)
*B29D 30/66*   (2006.01)
(Continued)

(52) U.S. Cl.
CPC .......... *B29C 33/3842* (2013.01); *B29D 30/66* (2013.01); *B33Y 80/00* (2014.12); *B29K 2883/00* (2013.01); *B29L 2031/757* (2013.01)

(58) Field of Classification Search
CPC ..... B29C 33/3842; B29C 33/40; B29C 33/38; B29C 33/3835; B29D 30/66;
(Continued)

(56) References Cited

U.S. PATENT DOCUMENTS 6,792,828 B2 *  9/2004  Ishihara ............... B60C 11/12
                                                        76/107.1
12,043,009 B2 * 7/2024  Windeshausen ... B29D 30/0662
(Continued)

FOREIGN PATENT DOCUMENTS

EP          2777922 A1 *  9/2014  ......... B29C 33/3835
EP          3819109 A1 *  5/2021  ......... B29C 33/3842
WO     WO-9858786 A1 * 12/1998  ......... B29C 33/0033

OTHER PUBLICATIONS

European Search Opinion in Application EP 22184500 (Year: 2022).*

(Continued)

*Primary Examiner* — Jacob J Cigna
(74) *Attorney, Agent, or Firm* — Katherine A. Smith

(57) ABSTRACT

The disclosure provides for a process for manufacturing a tread molding element configured to mold at least a portion of a tire tread, the process comprising the following successive steps of providing a first tread molding element that can be a 3D-printed element made of a plastic composition A; forming a reverse mold of the first tread molding element, wherein the reverse mold is made of a plastic composition B comprising one or more elastomers; heating the reverse mold to a temperature above 50° C. when the first tread molding element is a 3D-printed element made of a plastic composition A; and casting a second tread molding element from the reverse mold to obtain a second tread molding element; wherein the second tread molding element is made from a plastic composition C comprising one or more thermosetting resins.

20 Claims, 3 Drawing Sheets

(51) Int. Cl.
  *B29L 31/00*    (2006.01)
  *B33Y 80/00*    (2015.01)
(58) Field of Classification Search
  CPC .......................... B29D 30/0606; B33Y 80/00;
              B29K 2883/00; B29L 2031/757
  See application file for complete search history.

(56) References Cited

U.S. PATENT DOCUMENTS

| | | | |
|---|---|---|---|
| 12,064,903 B2* | 8/2024 | Garn | B29C 33/3842 |
| 2014/0265033 A1 | 9/2014 | Woloszyn et al. | |
| 2016/0009039 A1* | 1/2016 | Blanchet | B29D 30/0601 |
| | | | 219/76.12 |
| 2017/0001340 A1* | 1/2017 | Koyanagi | B22F 7/06 |
| 2023/0014862 A1* | 1/2023 | Garn | B29C 33/40 |

OTHER PUBLICATIONS

3D Printing Tips, Fused Filament Fabrication (FFF) material properties & considerations, 2015, https://web.archive.org/web/20150501000000*/http://www.powerspec.com/support/3DPrinters/3DPrintingTips.pdf, 5 pages, Wayback Machine.
Beaudoin et al., JMS-1704: Multihead 3D Printer, Worcester Polytechnic Institute, Dec. 16, 2016, pp. 1-52.

* cited by examiner

PROCESS FOR MANUFACTURING A TREAD MOLDING ELEMENT OF A TIRE-MOLD COMPRISING A THERMOSETTING POLYMER

TECHNICAL FIELD

The disclosure relates to the manufacture of tire-related molds, and more specifically, to the manufacture of molds for molding a tire or tire tread. The disclosure relates to the manufacture of mold segments, inserts with tread reverse imprint for mold segments, parts of mold segments and parts of inserts for easy prototyping of tires such as easy prototyping of tire treads.

TECHNICAL BACKGROUND

Pneumatic tires are manufactured according to relatively standardized processes and machinery. For example, a green tire, which is a tire in an uncured state, is inserted into a tire mold where it is cured and vulcanized. The tire mold is designed and acts to shape the tire and to mold a circumferential tread pattern onto the tire. The tire mold also typically forms written information, such as the tire size, performance recommendations, and branding onto the sides of the tire.

At the time of tire molding, the tire mold is closed by moving circumferential mold segments inward in a tire radial direction. Each segment shows on its inner face a plurality of blades extending into the mold, mostly in the radial direction, and forms a reverse imprint arranged to cut the surface of the green tire according to the desired tread pattern, wherein a blade arranged to protrude from the inner face of the mold segment cuts a groove or a sipe within the tread member of the tire. Then, the tire is subjected to vulcanization at an elevated temperature while it is contained within the mold.

When developing new tires there is a need to test different tread pattern designs to evaluate the performances of the resulting tire. The manufacturing of the associated mold is labor-intensive, time-consuming, and consequently expensive. Accordingly, it would be highly desirable to provide a low cost method that could be used to quickly and easily make mold segments or inserts for mold segments. Such a method would be of particular value in making molds for testing purposes and could also be of great value in the production of tires in general.

Tire molds are typically made from metal or metal alloy materials, such as aluminum or steel, which can be cast or machined in a computer numerical control (CNC) machine to form the desired negative tread pattern. The mold segments or the tire mold tread inserts can also be made from additive manufacturing technology in which the tire mold tread inserts are coupled to tire mold supports. It is therefore known to produce mold segments and tire mold tread inserts wherein the inserts show a tread reverse imprint of a tread pattern by three-dimensional printing (3D-printing) of metal and metal alloys, such as aluminum or steel. However, it has naturally been found to be desirable to further reduce the costs and the time associated with the 3D printing of metal and metal alloys.

EP2777922 describes a method and an apparatus for developing and forming a tire-related mold configured to at least mold a portion of a tire tread. The method includes creating a digital model representing a three-dimensional structure comprising a tread model molding member, the tread model molding member at least partially defining a molding cavity for forming a corresponding tire tread model. The three-dimensional structure comprising the tread model molding member is formed automatically using the digital model, the structure being formed by building the structure from one or more materials, the one or more materials including an elastic material such that the formed structure is elastic. A tread model is molded using the tread model molding member, while a tread molding element for forming at least a portion of a tread is molded from the tread model.

This method and apparatus are interesting, but there is a need to further improve the balance between costs and ease of production of a tread molding element, in other words, to provide a process for manufacturing a tread molding element configured to mold at least a portion of a tire tread that is more efficient and cost-effective. There is also a need for a process that is simple and fast.

One or more of the above needs can be fulfilled by a process of additive manufacturing, such as 3D-printing, wherein a reusable tread molding element that shows a reverse imprint of a tread pattern can be produced using a standard 3D printer. However, conventionally used 3D printed materials (PLA, PETG, Polycarbonate, Polyamides) are unable to withstand the vulcanization processes to generate tires or tire tread sections.

SUMMARY

The present disclosure provides for a process that can be carried out to rapidly generate a mold insert, which can be in particular used as a lab sample to enable rapid prototyping, whilst including the generation of fine tread groove details, instead of micromachining the geometries in specialized facilities.

According to a first aspect of this invention, the disclosure provides for a process for manufacturing a tread molding element configured to mold at least a portion of a tire tread, the process comprising the following successive steps of:
  providing a first tread molding element;
  forming a reverse mold of the first tread molding element, wherein the reverse mold is made of a plastic composition B comprising one or more elastomers; and
  casting a second tread molding element from the reverse mold to obtain a second tread molding element; wherein the second tread molding element is made from a plastic composition C comprising one or more thermosetting resins.

According to a second aspect, the disclosure provides for a process for manufacturing a tread molding element configured to mold at least a portion of a tire tread, the process comprising the following successive steps of:
  providing a first tread molding element that is a 3D-printed element made of a plastic composition A;
  forming a reverse mold of the first tread molding element, wherein the reverse mold is made of a plastic composition B comprising one or more elastomers;
  heating the reverse mold to a temperature above 50° C.; and
  casting a second tread molding element from the reverse mold to obtain a second tread molding element; wherein the second tread molding element is made from a plastic composition C comprising one or more thermosetting resins.

Some of the advantages with such processes are that the benefits of 3D printing can be used to produce a fine tread molding element without being restricted by the chemical nature of the 3D printed part in regard to whether it is compatible with vulcanization. The disclosed process thus allows for the replication with a high level of accuracy the morphological specificities of the 3D printed part, such as fine groves. This process also allows for an easy means for the production of a tread molding element which is comprised of a plastic composition which can resist vulcanization and which can be used for the production of a tire tread element.

The following can be used to further define the process according to the first aspect and the second aspect.

In an embodiment, the step of providing a first tread molding element comprises the following sub-steps:
  modeling a three-dimensional shape of a tread molding element through a modeling program;
  providing a plastic composition A comprising one or more polymers;
  forming a first tread molding element by 3D printing from the plastic composition A based on the modelled three-dimensional shape of the tread molding element; and
  providing the first tread molding element.

In another embodiment, the step of providing a first tread molding element comprises the following sub-steps:
  providing a tire or a part of a tire having a tread portion;
  forming a replica mold of the tread portion of the tire or the part of a tire, wherein the replica mold is made of a plastic composition B comprising one or more elastomers wherein the replica mold is the first tread molding element; and
  providing the first tread molding element.

With preference, the tire or the part of a tire having a tread portion is produced by 3D-printing so that the step of providing a tire or a part of a tire having a tread portion comprises the following sub-steps
  modeling a three-dimensional shape of a tire or a part of a tire having a tread portion through a modeling program;
  providing a plastic composition A comprising one or more polymers;
  forming a tire or a part of a tire having a tread portion by 3D printing from the plastic composition A based on the modelled three-dimensional shape of a tire or a part of a tire having a tread portion; and
  providing the tire or the part of a tire having a tread portion.

For example, the plastic composition A is provided in the form of one or more filaments.

For example, the step of forming a tire or a part of a tire having a tread portion or a tread molding element by 3D printing from the plastic composition A includes performing the 3D printing by a 3D printer; with preference, the 3D printer is a Fused Filament Fabrication printer. The 3D printers may be of the multiple filaments type. A suitable 3D printer with multiple filaments can be found under the commercial denomination Markforged.

For example, the step of forming a tire or a part of a tire having a tread portion or a tread molding element by 3D printing from the plastic composition A includes extrusion of the one or more plastic compositions wherein the extrusion temperature is at least 220° C., for example at least 230° C., for example at least 240° C.

For example, the step of forming a tire or a part of a tire having a tread portion or a tread molding element by 3D printing from the plastic composition A includes depositing layers of the one or more plastic compositions on a heated print bed wherein the print bed temperature is at least 40° C.; for example, at least 50° C.; for example, at least 60° C.

In an embodiment, the process further comprises a step of heating the reverse mold to a temperature comprised between 50° C. and 200° C. before the step of casting a second tread molding element from the reverse mold; preferably from between 60° C. and 150° C.

As Regards the Plastic Composition A

There is no requirement of a specific melting temperature for the plastic composition A. Thus, in an embodiment, one or more polymers of the composition A have a melting point below 200° C. as determined according to ISO 3146:2000; preferably below 190° C., more preferably below 180° C., even more preferably below 170° C.

In an embodiment, the plastic composition A is or comprises one or more polymers selected from the group comprising polyoxymethylene, acrylonitrile butadiene styrene, polyamide, polyether ether ketone, cellulose acetate, cellulose acetate propionate, polylactic acid, polyethylene terephthalate, polyethylene terephthalate glycol, polymethylmethacrylate, polypropylene, polystyrene, polyvinyl chloride, polychloroethene, polyester resin, polycarbonate, thermoplastic polyurethane, polyether sulfone, poly(vinyl alcohol), polyphenyl sulfone and polyetherimide.

For example, the plastic composition A is or comprises one or more polymers selected from polyamide, acrylonitrile butadiene styrene, polylactic acid, polyethylene terephthalate, poly(vinyl alcohol), polyethylene terephthalate glycol, thermoplastic polyurethane and polycarbonate.

As Regards the Composition B

In an embodiment, the plastic composition B is or comprises a curable elastomer composition selected from an addition reaction type polymer composition, a room-temperature-vulcanizing polymer composition, a UV-curable polymer composition or a thermoplastic-curable polymer composition.

With preference, the plastic composition B is or comprises a silicone resin composition selected from an addition reaction type silicone resin composition comprising two or more organopolysiloxanes, an addition reaction catalyst and an optional organohydrogenpolysiloxane.

For example, the plastic composition B is or comprises polydimethylsiloxane (PDMS).

For example, the plastic composition B has an initial mixed viscosity at 25° C. that is less than or equal to 20 Pa·s; the initial mixed viscosity at 25° C. is determined according to ASTM D2393-86.

As Regards the Plastic Composition C

In an embodiment, the one or more thermosetting resins in the plastic composition C are selected from polyoxybenzylmethylenglycolanhydride resins, polyepoxide resins, polybenzoxazine resins, polyimide resins and cyanate ester resins.

For example, the plastic composition C is or comprises polyepoxide resins.

In an embodiment, the plastic composition C is a composite comprising one or more thermosetting resins and one or more reinforcing materials selected from carbon fibers and glass fibers.

For example, the one or more thermosetting resins in the polymer plastic composition C are selected to have, in the uncured state, a viscosity ranging from 5 to 35 Pa s as determined by a Brookfield viscometer at 100 rpm with spindle RV S07 at 25° C. For example, the plastic composition C has a tensile strength of at least 35 N/mm2 according to ASTM D 638.

In an embodiment, the plastic composition A is different from the plastic composition C.

According to a third aspect, the disclosure provides for the use of a plastic composition C in a process for manufacturing a tread molding element configured to mold at least a portion of a tire tread by casting from a reverse mold, wherein the plastic composition B is or comprises a curable elastomer composition and the plastic composition C comprises one or more thermosetting resins. With preference, the one or more thermosetting resins in the plastic composition C are selected from polyoxybenzylmethylenglycolanhydride resins, polyepoxide resins, polybenzoxazine resins, polyimide resins and cyanate ester resins.

For example, the process for manufacturing a tread molding element configured to mold at least a portion of a tire tread is according to the first and/or according to the second aspect.

According to a fourth aspect, the disclosure provides for a tread molding element configured to mold at least a portion of a tire tread, wherein the tread molding element is made of or is comprising a plastic composition C comprising one or more thermosetting resins selected from polyoxybenzylmethylenglycolanhydride resins, polyepoxide resins, polybenzoxazine resins, polyimide resins and cyanate ester resins. With preference, the tread molding element is the second tread molding element of the process according to the first and/or according to the second aspect.

With preference, the plastic composition C has a tensile strength of at least 35 N/mm$^2$ according to ASTM D 638 and/or a hardness (Shore D) above 50 according to ASTM D2240.

For example, the plastic composition C is or comprises polyepoxide resins.

For example, the plastic composition C is a composite comprising one or more thermosetting resins and one or more reinforcing materials selected from carbon fibers and glass fibers.

In an embodiment, the tread molding element (i.e., the second tread molding element) is casted.

In an embodiment, the tread molding element (i.e., the second tread molding element) comprises a body and at least one rib or blade, and the body is formed of a plastic composition C different from the plastic composition used to form the blades.

According to a fifth aspect, the disclosure provides for the use of a plastic composition C in a tread molding element, wherein the composition C is comprising one or more thermosetting resins selected from polyoxybenzylmethylenglycolanhydride resins, polyepoxide resins, polybenzoxazine resins, polyimide resins and cyanate ester resins. With preference, the tread molding element is according to the fourth aspect.

According to a sixth aspect, the disclosure provides for a method for manufacturing a tire or a section of a tire; the method comprising providing one or more tread molding elements made from the process according to the first aspect and/or according to the second aspect and molding a tire or a portion of a tire using the one or more tread molding elements. With preference, the one or more tread molding elements are according to the fourth aspect.

For example, molding a tire or a portion of a tire using the one or more tread molding elements comprises providing a green tire or a portion of a green tire and performing vulcanization of the green tire or the portion of a green tire at a temperature of at least 120° C. and for a time of at least 20 minutes in presence of the one or more tread molding elements.

Definitions

For the disclosure, the following definitions are given:

The terms "comprising", "comprises" and "comprised of" as used herein are synonymous with "including", "includes" or "containing", "contains", and are inclusive or open-ended and do not exclude additional, non-recited members, elements or method steps. The terms "comprising", "comprises" and "comprised of" also include the term "consisting of".

The recitation of numerical ranges by endpoints includes all integer numbers and, where appropriate, fractions subsumed within that range (e.g. 1 to 5 includes 1, 2, 3, 4 and 5 when referring to, for example, a number of elements, and can also include 1.5, 2, 2.75 and 3.80, when referring to, for example, measurements). The recitation of endpoints also includes the recited endpoint values themselves (e.g. from 1.0 to 5.0 includes both 1.0 and 5.0). Any numerical range recited herein is intended to include all sub-ranges subsumed therein.

The reference throughout this specification to "one embodiment" or "an embodiment" means that a particular feature, structure or characteristic described in connection with the embodiment is included in at least one embodiment of the present disclosure. The particular features, structures, characteristics or embodiments may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the disclosure and form different embodiments, as would be understood by those in the art.

Unless otherwise defined, all terms used in the disclosure, including technical and scientific terms, have the meaning as commonly understood by one skilled in the art to which this disclosure belongs. By means of further guidance, definitions for the terms used in the description are included to better appreciate the teaching of the present disclosure.

"Asymmetric tread" means a tread that has a tread pattern not symmetrical about the centre plane or the equatorial plane of the tire.

"Symmetric tread" means a tread that has a tread pattern symmetrical about the centre plane or the equatorial plane of the tire.

"Directional Tread Pattern" means a tread pattern designed for a specific direction of rotation.

"Circumferential" means lines or directions extending along the perimeter of the surface of the annular tread perpendicular to the axial direction.

"Axial" means lines or directions that are parallel to the axis of rotation of the tire.

"Sipes" means small slots molded into the tread elements that subdivide the tread surface and improve traction. A sipe is narrower than a groove.

"Green tire" means a tire in an uncured state; i.e., before a step of vulcanization.

In the disclosure, "3D printing" and "three-dimensional printing" are used as synonymous. In the same way, "3D printer" and "three-dimensional printer" are used as synonymous.

DESCRIPTION OF THE DRAWINGS

The invention will be described by way of example and with reference to the accompanying drawings in which.

DETAILED DESCRIPTION

The following is an explanation of a process according to the present disclosure for molding a pneumatic or non-pneumatic tire. The process is also suitable for molding a relevant part of a pneumatic or non-pneumatic tire for testing purposes. The present disclosure is also related to the tread molding element used in the said process and to the pneumatic or non-pneumatic tire or to the parts of a pneumatic or non-pneumatic tire produced according to said process. The pneumatic or non-pneumatic tire or the parts thereof can have either a symmetric tread, or an asymmetric tread, or a directional tread pattern.

Figure 1:
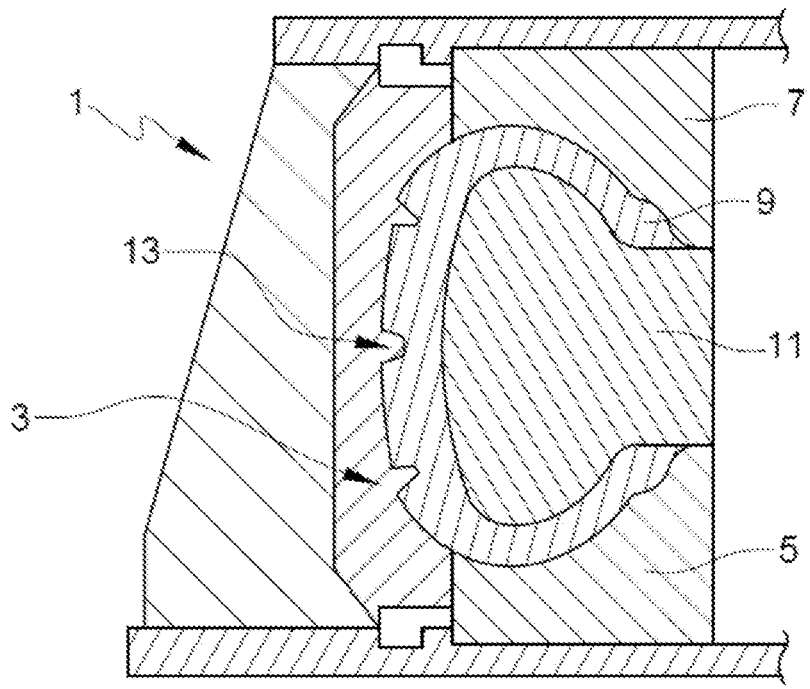
FIG. 1 is a partial cross-sectional view of a tire in a tire mold.

Reference is made to FIG. 1 that is a cross-sectional view showing an outline structure of a tire metallic mold 1. The tire mold 1 includes a tread molding section 3 arranged on an outer periphery thereof to mold a tread pattern of a tire, a lower side molding section 5, and an upper side molding section 7 which mold the sides of a tire. A green tire 9 is supported on a rigid core 11 and set in the mold 1 upon closing of the respective molding sections (3, 5, 7) in the state to be subjected to vulcanizing and molding of the green tire 9 in the mold 1.

Figure 2:
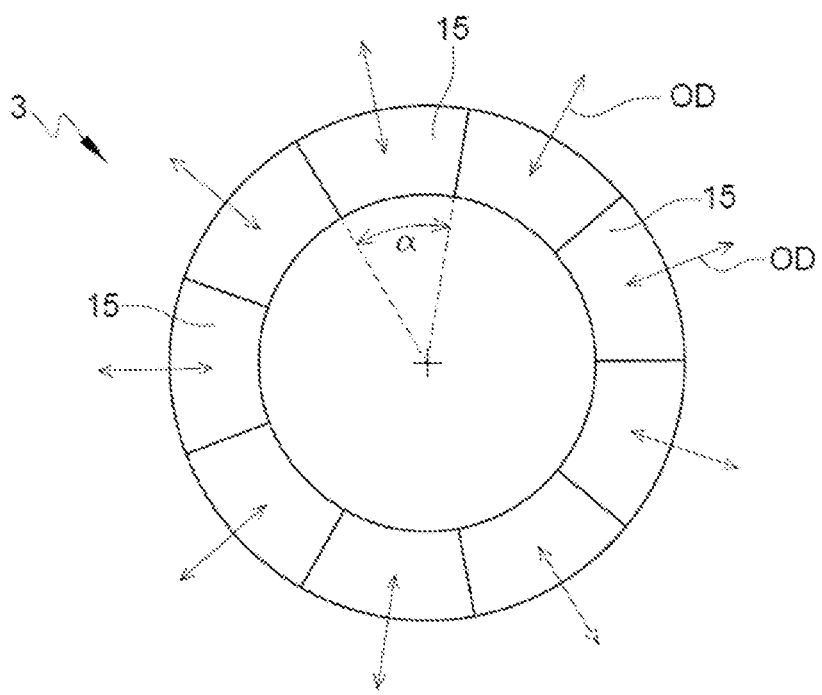
FIG. 2 is a view showing a state in which the tread molding section is closed.

FIG. 2 shows the tread molding section 3 for molding of a tire tread divided in a tire circumferential direction into a plurality of mold segments 15. Each mold segment 15 has an inner face curved along the circumferential direction according to an arc defined by an angle α. The tread molding section 3 may comprise from 4 to 20 mold segments 15; preferably, from 5 to 12 mold segments 15; more preferably, from 6 to 10 mold segments 15; and most preferably, from 6 to 9 mold segments 15.

The tread molding section 3 illustrated in FIG. 2 is divided into 9 mold segments 15 which are movable to open and close the tire mold 1 according to an operating direction OD. Each mold segment 15 extends along its length about a portion of the tire's circumference, so each mold segment has an inner face curved along the circumferential direction.

Each mold segment comprises a body with an inner face that is equipped with a plurality of blades for molding the tread pattern. The blades extend from the inner face into the tire mold. They have one end attached to the inner face (i.e., the proximal end) and one free end (i.e., the distal end). Blades may be of any direction depending on the tread pattern that is desired. For example, the mold segments may comprise one or more longitudinal ribs 13 (shown on FIG. 1) to mold circumferential grooves, one or more longitudinal blades to mold circumferential sipes, one or more lateral ribs to mold transversal grooves, and one or more lateral blades to mold transversal sipes on a tread surface of the green tire. The transversal grooves or sipes extend in directions intersecting circumferential grooves and sipes provided on the tread surface. The transversal grooves or sipes are not necessarily perpendicular to the circumferential grooves or sipes, that is, they may extend in directions inclined to the circumferential grooves or sipes. Also, the transversal sipes have a width smaller than transversal grooves so that the lateral blades are thinner than the lateral ribs.

In an embodiment, the mold segment is one with the body whose inner face is equipped with a plurality of blades and/or ribs for molding the tread pattern. In another embodiment, the mold segment is formed by a support and an insert wherein the body of the insert has an inner face that is equipped with a plurality of blades and/or ribs for molding the tread pattern.

The disclosure provides for a process for manufacturing a tread molding element configured to mold at least a portion of a tire tread, the process comprising the following successive steps of:
  providing a first tread molding element;
  forming a reverse mold of the first tread molding element, wherein the reverse mold is made of a plastic composition B comprising one or more elastomers; and
  casting a second tread molding element from the reverse mold to obtain a second tread molding element; wherein the second tread molding element is made from a plastic composition C comprising one or more thermosetting resins.

According to another definition, the disclosure provides for a process for manufacturing a tread molding element configured to mold at least a portion of a tire tread, the process comprising the following successive steps of:
  providing a first tread molding element that is a 3D-printed element made of a plastic composition A;
  forming a reverse mold of the first tread molding element, wherein the reverse mold is made of a plastic composition B comprising one or more elastomers;
  heating the reverse mold to a temperature above 50° C.; and
  casting a second tread molding element from the reverse mold to obtain a second tread molding element; wherein the second tread molding element is made from a plastic composition C comprising one or more thermosetting resins.

The following applies regardless of the definition used.

For example, the tread molding element is selected from a mold, a mold segment, an insert, a prototype of a mold segment, and a prototype of an insert. For example, the tread molding element is selected from an insert of a prototype of an insert. For example, the tread molding element is selected from mold segment or a prototype of a mold segment.

For example, a prototype of a mold segment and a prototype of an insert are a representative section of the corresponding mold segment and insert wherein the length according to the circumferential direction of a tire is reduced. For example, the prototype has a length according to the circumferential direction of a tire which is within the range of 10 mm to 500 mm; for example, from 15 mm to 250 mm; for example, from 20 mm to 100 mm; or for example, from 25 mm to 50 mm.

In a first embodiment, the first tread molding element is produced by molding so that the step of providing a first tread molding element comprises the following sub-steps:
  providing a tire or a part of a tire having a tread portion;
  forming a replica mold of the tread portion of the tire or the part of a tire, wherein the replica mold is made of a plastic composition B comprising one or more elastomers wherein the replica mold is the first tread molding element; and
  providing the first tread molding element.

With preference, the tire or the part of a tire having a tread portion is produced by 3D-printing so that the step of providing a tire or a part of a tire having a tread portion comprises the following sub-steps:

modeling a three-dimensional shape of a tire or a part of a tire having a tread portion through a modeling program;

providing a plastic composition A comprising one or more polymers;

forming a tire or a part of a tire having a tread portion by 3D printing from the plastic composition A based on the modelled three-dimensional shape of a tire or a part of a tire having a tread portion;

optionally annealing the tire or the part of a tire having a tread portion; and providing the tire or the part of a tire having a tread portion.

In a second embodiment, the first tread molding element is produced by 3D-printing so that the step of providing a first tread molding element comprises the following sub-steps:

modeling a three-dimensional shape of a tread molding element through a modeling program;

providing a plastic composition A comprising one or more polymers;

forming a first tread molding element by 3D printing from the plastic composition A based on the modelled three-dimensional shape of the tread molding element;

optionally annealing the first tread molding element; and providing the first tread molding element.

Depending upon the embodiment selected, the process may comprise a step of 3D printing an element being a tire, a part of a tire or a tread molding element. Such element produced by 3D printing and selected from a tire, a part of a tire or a tread molding element is called is a 3D printed element in the following description.

3D printing, also known as additive manufacturing, is the process by which a product is built layer by layer using raw material rather than taking material away from a larger stock.

Regardless of the embodiment selected, the 3D-printing step can be performed as follows: The plastic composition A can take many forms; however, it is preferred that the plastic composition A is provided in the form of one or more filaments so that the process is performed using a filament-based 3D printer such as a Fused Filament Fabrication (FFF) printer. FFF printers involve spools of filament fed through a heated extruder and deposited in layers on a print bed which is a flat surface. When ready to begin printing, the filament is unwound from a coil through an extrusion nozzle. The material is then heated until molten and laid down on the print bed by the extruder, in a shape controlled via computer and 3D modeling software. As the material exits the extruder nozzle, it fuses to itself and hardens. This process is repeated, building the product up layer by layer until the 3D printed element has been fully realized.

In an embodiment, the step of modeling a three-dimensional shape is made through a modeling program that can be recognized by a 3D printer and includes creating a digital model representing the three-dimensional shape of a 3D printed element selected from a tire having a tread portion, a part of a tire having a tread portion, or a tread molding element. For example, the digital model is created from the modeling program.

For example, the 3D printed element is a tread molding element and the three-dimensional shape of a tread molding element at least partially defines a molding cavity for forming a corresponding tire tread pattern. In performing this step, it is understood that a digital model is created to represent a three-dimensional structure comprising a molding member for use in molding a physical tire or a section of a tire. The molding member has a cavity with a reverse imprint of a tread pattern.

For example, the three-dimensional shape of a tire or a part of a tire at least partially defines the tread pattern of the tread portion of the tire. In performing this step, it is understood that a digital model is created to represent a three-dimensional structure comprising at least a part of a tread pattern of a tire.

The modeling program is a three-dimensional modeling program. Such programs are known to the person skilled in the art and are commercially available. Examples of suitable modeling programs include but are not limited to AutoCAD, 3D Max, SolidWorks, CATIA, SketchUp, Maya, Inventor, and Pro Engineer. For example, the modeling program is CATIA. The terms "CATIA" and "Computer Aided Three-Dimensional Interactive Application" as used herein refer to program forming a multi-platform CAD/CAM/CAE commercial software suite. It was developed by Dassault Systèmes (Vélizy-Villacoublay, France), and is commercially available from sources known by those having ordinary skill in the art, such as IBM Corporation (Armonk, N.Y.)

The three-dimensional modeling program is used to model the three-dimensional shape of the object, convert it to an STL file (i.e. "Standard Triangle Language" file).

Filament-based 3D printers, such as FFF printers, are known to the person skilled in the art and commercially available. The FFF printers comprise an extruder and a hotend. The extruder drives the filament through the 3D printing system and is responsible for controlling the material feed into the hot-end. The extruder typically comprises a stepper motor that activates gears, which in turn grip the filament and push it through the hotend and onto the print bed. The hot-end is the component of a 3D printer that melts the filament for extrusion and helps to maintain a consistent and accurate temperature for successful prints. The hot-end is responsible for melting and depositing material. The hot-end typically comprises a guiding tube for the filament, a heating element, and a brass nozzle. The extruder will drive the filament through the hot-end where it will be heated until molten and then further extruded through the nozzle and onto the print bed. Once heated, the nozzle also serves to decrease the filament diameter from the initial 1.75 or 3.00 mm to a diameter that may range from 0.2 to 0.4 mm, depending on the nozzle. For example, the initial filament diameter is 1.75 mm.

According to the disclosure, the 3D printed element selected from a tire, a part of a tire, or a tread molding element, is produced from a plastic composition A comprising one or more polymers, such as one or more thermoplastic polymers.

Materials that may especially qualify as 3D printable materials may be selected from the group consisting of metals, glasses, thermoplastic polymers, silicones, etc. However, in the present disclosure, it is preferred that the 3D printable is a plastic material and comprises a polymer. For example, the plastic composition A is or comprises one or more selected from the group comprising polyoxymethylene (POM), acrylonitrile butadiene styrene (ABS), polyamide (PA), polyether ether ketone (PEEK), cellulose acetate, cellulose acetate propionate, polylactic acid (PLA), polyethylene terephthalate (PET), polyethylene terephthalate glycol (PETG), polymethylmethacrylate (PMMA), polypropylene (PP), polystyrene (PS) (such as high-impact polystyrene (HIPS)), polyvinyl chloride (PVC), polychloroethene, polyester resin, polycarbonate (PC), thermoplastic polyurethane (TPU), Poly(vinyl alcohol) (PVOH), polyether sulfone, polyphenyl sulfone, and polyetherimide. It should be understood that all possible mixtures of the listed products are encompassed by the present disclosure. For example, the plastic composition A is or comprises polylactic acid and polyethylene terephthalate glycol. Such mixture is known to the person skilled in the art and commercially available from ZHUHAI SUNLU INDUSTRIAL CO., LTD under the denomination SPLA.

Preferably, the plastic composition A is or comprises one or more polymers selected from polyamide, polyether ether ketone, polyetherimide, polyethylene terephthalate, polyethylene terephthalate glycol, polylactic acid, acrylonitrile butadiene styrene, high-impact polystyrene, thermoplastic polyurethane, polyphenylsulfone, poly(vinyl alcohol), and polycarbonate.

More preferably, the plastic composition A is or comprises one or more polymers selected from polyamide, acrylonitrile butadiene styrene, polylactic acid, polyethylene terephthalate, poly(vinyl alcohol), polyethylene terephthalate glycol, thermoplastic polyurethane, and polycarbonate. In an embodiment, the plastic composition A is or comprises polyethylene terephthalate, a polyethylene terephthalate copolymer, and/or polyethylene naphthalate.

There is no requirement of a specific melting temperature for the plastic composition A. Thus, in an embodiment, one or more polymers of the plastic composition A have a melting point below 300° C. or below 250° C. as determined according to ISO 3146:2000; preferably below 200° C. or below 190° C., more preferably below 180° C., even more preferably below 170° C.

For example, one or more polymers of the plastic composition A have a melting point of at least 100° C. as determined according to ISO 3146:2000; preferably at least 110° C., more preferably at least 120° C., even more preferably at least 130° C.

For example, the step of forming an element wherein the element is selected by 3D printing from the one or more plastic compositions includes building the 3D printed element from a plurality of layers made from the deposition of a plastic composition wherein the 3D printed element is divided into at least two sections, each of the at least two sections being made of different plastic compositions.

For example, the 3D printed element is a first tread molding element and the step of forming a tread molding element by 3D printing from the one or more plastic compositions includes forming at least one rib or blade by 3D printing from the one or more plastic compositions.

Figure 3:
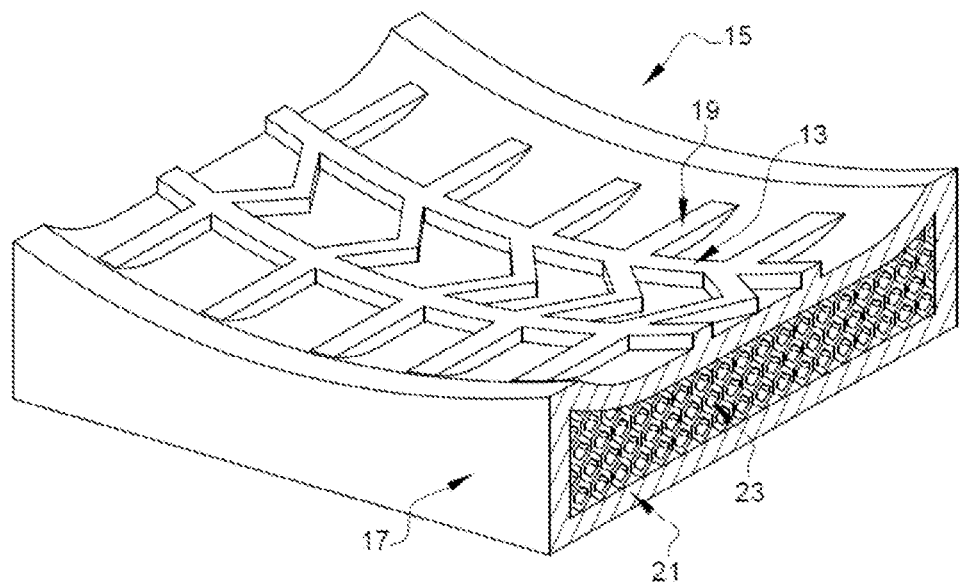
FIG. 3 is a view showing an example of a tread molding element according to the disclosure.

FIG. 3 is illustrating 3D printed element being a first tread molding element being a mold segment 15 according to the disclosure. The tread molding element 15 comprises a body 17 and at least one rib or blade (13, 19) and the one or more plastic compositions used to form the body 17 can be the same or different from the one or more plastic compositions used to form at least one rib or blade (13, 19). For example, both the body 17 and at least one rib or blade (13, 19) are formed from the same plastic composition. For example, mold segment 15 illustrated in FIG. 3 includes a body 17 comprises a shell 21 and an infill 23. The shell 21 and at least one rib or blade (13, 19) are formed from the same plastic composition whereas the infill 23 is formed from a different plastic composition. For example, the entire tread molding element 15 can be formed from a single plastic composition.

For example, the 3D printed element can be comprised of a shell 21 and an infill 23, wherein the shell 21 is made of a plastic composition that is the same or different from the one or more plastic compositions used to make the infill 23; with it preferably being different.

The print surface is preferably cleaned before use, for example by using a poler organic solvent, such as acetone, ethyl alcohol, normal propyl alcohol, or isopropyl alcohol to remove all grease and residue from the print bed.

It is preferable to heat the print bed of the 3D printer to reduce shrinking and separation of the 3D-printed element from the print bed. The print bed temperature is selected according to the composition A. For example, the print bed temperature will typically be within the range of 40 to 100° C., preferably from 50 to 95° C., more preferably from 60 to 90° C.

It is preferable to use an adhesive to bond the 3D printed element to the print bed. A suitable adhesive that can be used in the context of the disclosure is a Nano Polymer Adhesive such as the one commercially available from Vision Miner.

The extrusion temperature of the plastic composition A (i.e. of the filament of plastic composition) is selected to promote the adhesion of the first layer. For example, the extrusion temperature is selected according to the polymer of the plastic composition A. In an embodiment, the extrusion temperature is at least 230° C.; for example, at least 240° C.; for example, at least 250° C.; or for example, at least 260° C. The extrusion temperature is at most 400° C.; for example, at most 350° C. For example, the extrusion temperature is ranging from 250° C. to 300° C. Increasing the print temperature can improve the adhesion of the first layer. However, when the extrusion temperature is too high, the filament will continue to melt and leak from the nozzle causing threads and burrs. On the contrary, when the extrusion temperature is set too low, this may cause gaps or separation between the layers. Suitable hotends that can be used for extrusion temperatures of up to 400° C. are available under the commercial name Dragon All Metal Hotend.

The 3D printed element can be solid or can have two distinct zones, i.e., a shell and an internal part (also named infill). The shell forms the outer walls of the 3D-printed element in which both the layers in contact with the printing base and the top layers that attribute the final surface finish are included. For example, the 3D-printing element is a tread molding element and comprises a shell and an infill wherein the shell includes an inner face and one or more ribs or one or more blades that are arranged to protrude from the inner face of the tread molding element to form a reverse imprint of a tread pattern. The reverse imprint can be used in a process for manufacturing a tire or a section of a tire to cut the surface of a green tire, or of a section of the green tire, according to the desired tread pattern.

The amount of material that occupies the internal part of the shell is called the infill percentage. Said infill percentage can be adjusted from a suitable program that will drive the 3D printer. Suitable programs such as rolling programs are known by the person skilled in the art and are commercially available.

The infill percentage can range from 0 vol. % (i.e., hollow part) to 100 vol. % (i.e., totally solid part). The use of a shell and infill form allows a good compromise between rigidity and costs. The person skilled in the art will find an advantage to use an infill percentage of at least 10 vol. %; preferably at least 20 vol. %; more preferably at least 30 vol. %, for example at least 35 vol. %; for example, at least 50 vol. %. The infill can be at most 95 vol. %, for example at most 75 vol. %. For example, the infill is ranging from 10 to 60 vol. %; preferably from 15 to 50 vol. %; for example, from 20 to 45 vol. %, or from 25 to 40 vol. %. Increasing the infill will increase the rigidity of the 3D-printed element but also the print time and the amount of the one or more plastic compositions used to print the 3D printed element.

The infill can show an infill pattern of any shape such as rectangular, triangular, hexagonal, or tri-hexagonal (i.e., hexagons interspersed with triangles). It is preferred that the shape of the infill pattern is hexagonal to offer to the 3D-printed element a great resistance in all directions. In FIG. 3, the infill 23 pattern is hexagonal. The infill pattern structure can be in 2D or 3D.

The Step of Forming a Reverse Mold of the First Tread Molding Element

Once the first tread molding element is provided, a reverse mold is produced from the first tread molding element. The reverse mold is produced from a plastic composition B comprising one or more elastomers.

Advantageously, the plastic composition B has an initial mixed viscosity at 25° C. that is less than or equal to 20 Pa·s; preferably less than or equal to 15 Pa·s, preferably less than or equal to 12 Pa·s; the initial mixed viscosity at 25° C. is determined according to ASTM D2393-86. For example, the initial mixed viscosity at 25° C. of the composition B may be in the range of about 0.05 Pa·s to 20 Pa·s; for example, from 1 Pa·s to 18 Pa·s; for example, from 5 Pa·s to 15 Pa·s; or for example, from 7 Pa·s to 12 Pa·s.

The use of a low viscosity composition allows to avoid the need to vacuum.

In an embodiment, the plastic composition B is or comprises a curable elastomer composition selected from an addition reaction type polymer composition, a room-temperature-vulcanizing polymer composition, a UV-curable polymer composition or a thermoplastic-curable polymer composition.

For example, the plastic composition B is an addition reaction type polymer composition selected from an addition reaction type silicone resin composition comprising two or more organopolysiloxanes, an addition reaction catalyst and an optional organohydrogenpolysiloxane. Suitable addition reaction type silicone resin compositions are for example described in EP3061783 and in EP2940077 which are incorporated herein by reference.

In this context, the addition of a reaction catalyst to induce an addition curing reaction on the composition to proceed may be contemplated. For instance, there are platinum-based catalysts, palladium-based catalysts and rhodium-based catalysts.

Typically, platinum-based catalysts may be used such as platinum, platinum black and chloroplatinic acid, illustrative examples of which include $H_2PtC_{16}·mH_2O$, $K_2PtC_{16}$, $KHPtC_{16}·mH_2O$, $K_2PtC_{14}$, $K_2PtClA·mH_2O$ and $PtO_2·mH_2O$ (m being a positive integer), as well as complexes of these with hydrocarbons (e.g., olefins), alcohols or vinyl group-containing organopolysiloxanes.

An example of a suitable addition reaction type silicone resin composition is known under the denomination Mold Star™ 20T and sold by Smooth-On, Inc. The Mold Star™ 20T has an initial mixed viscosity at 25° C. of 11,000 cP (i.e. 11 Pa·s) as determined according to ASTM D2393-86, with a curing time of less than 1 hour at room temperature.

For example, the plastic composition B is polydimethyl-siloxane (PDMS). PDMS is commercially available for example under the commercial denomination Sylgard™ 184 from Dow Chemical, MI, USA. In one embodiment, the PDMS based elastomer and curing agent are mixed in a 10:1 ratio by mass, poured on the 3D-printed element, placed under vacuum for about 30 minutes to degas, and cured in an oven at 80° C. for more than 2 hours.

For example, the plastic composition B is or comprises a room-temperature-vulcanizing silicone polymer composition, styrene-butadiene copolymer composition, polychloroprene polymer composition or ethylene vinyl acetate copolymer composition.

For example, the first tread molding element is placed in a container of adapted size. The plastic composition B is a prepared. When the plastic composition B is an addition reaction type polymer composition, the different components are mixed and poured on the first tread molding element. After the curing of the plastic composition B the reverse mold is demolded.

In an embodiment, the step of forming a reverse mold comprises casting of the curable elastomer composition wherein the casting is carried-out in order to eliminate any air bubbles; by submitting the curable elastomer composition cast to a reduced air pressure before and/or whilst said curable elastomer composition is curing.

The step of forming and casting a second tread molding element from the reverse mold:

Once the reverse mold is prepared, it can be used to make a second tread molding element in a polymer plastic composition C that is suitable to sustain a vulcanization process and that contains one or more thermosetting resins.

In an embodiment, the one or more thermosetting resins in the polymer plastic composition C are selected from polyoxybenzylmethylenglycolanhydride resins, polyepoxide resins, polybenzoxazine resins, polyimide resins and cyanate ester resins. With preference, the one or more thermosetting resins in the polymer plastic composition C are or comprise polyepoxide resins.

In an embodiment, the one or more thermosetting resins in the polymer plastic composition C are selected to have, in the uncured state, a viscosity of at most 25 Pa s as determined by a Brookfield viscometer at 100 rpm with spindle RV S07 at 25° C.

Advantageously, the one or more thermosetting resins in the polymer plastic composition C are selected to have, in the uncured state, a viscosity of at least 5 Pa·s; preferably of at least 8 Pa·s; more preferably of at least 10 Pa·s; even more preferably of at least 12 Pa·s, and most preferably of at least 15 Pa·s.

Advantageously, the one or more thermosetting resins in the polymer plastic composition C are selected to have, in the uncured state, a viscosity of at most 35 Pa·s; preferably of at most 32 Pa·s; more preferably of at most 30 Pa·s; even more preferably of at most 28 Pa·s, and most preferably of at most 25 Pa·s.

For example, the one or more thermosetting resins in the polymer plastic composition C are selected to have, in the uncured state, a viscosity ranging from 5 to 35 Pa s as determined by a Brookfield viscometer at 100 rpm with spindle RV S07 at 25° C.; preferably from 10 to 30 Pa s, more preferably from 12 to 28 Pa s; even more preferably from 15 to 25 Pa·s.

For example, the one or more thermosetting resins in the polymer plastic composition C are or comprise polyepoxide resins. Suitable polyepoxide resins are for example described in EP2794757 which is incorporated herein by reference.

Polyepoxyde resins according to the present disclosure may be commercial casting epoxy material which comes in two parts, namely the resin and the hardener, which are mixed in accordance with the manufacturer's recommendations to form a liquid epoxy mixture.

Suitable epoxy composition is 832HT commercially available from MG chemicals and that shows, in the uncured state, a viscosity of 21.9 Pa s as determined by a Brookfield viscometer at 100 rpm with spindle RV S07 at 25° C.

Another example of suitable polyepoxyde resin that is commercially available is CONAPDXY® FR-1080 Conapoxy (FR-1080, Cytec Industries Inc., Olean, N.Y., USA) which can be used in a 3:2 volume ratio of resin and curing agent with a curing at 120° C. for 6 hours.

Advantageously, the thermoplastic resins in the polymer plastic composition C have, once cured, the physical properties to withstand vulcanization processes.

Such resins are known in the art and consist of resins presenting a service temperature (i.e. temperature resistance) of at least 180° C.; for example, at least 185° C.; for example, at least 190° C.; for example, at least 205° C.; for example, at least 220° C.; for example, at least 230° C.; or for example, at least 240° C.

In an embodiment, the polymer plastic composition C presents a hardness (Shore D) above 50 (ASTM D2240), preferably above 60, more preferably above 80, and most preferably above 85. For example, the polymer plastic composition C has a hardness (Shore D) which is typically between 50 and 150 (ASTM D2240), preferably between 60 and 140, more preferably between 80 and 130, and most preferably between 85 and 120 shore (D).

For example, the polymer plastic composition C has a tensile strength of at least 35 $N/mm^2$ according to ASTM D 638; for example, at least 38 $N/mm^2$; for example, at least 40 $N/mm^2$; for example, at least 42 $N/mm^2$; for example, at least 45 $N/mm^2$.

For example, the polymer plastic composition C is a composite comprising one or more thermosetting resins and one or more reinforcing materials selected from carbon fibers and glass fibers.

In an embodiment, the reverse mold is heated to a temperature above 50° C., for example above 60° C., or for example above 70° C., before the polymer plastic composition C is casted.

For example, the reverse mold is heated to a temperature comprised between 50° C. and 200° C., between 60° C. and 150° C., or between 70° C. and 100° C. before the polymer plastic composition C is casted.

The disclosure also provides for a method for manufacturing a tire or a section of a tire; the method comprising providing the second tread molding element made from a polymer plastic composition C comprising one or more thermosetting resins made from the process of the present disclosure and molding a tire or a portion of a tire using the second tread molding element. With preference, molding a tire or a portion of a tire using the second tread molding element comprises providing a green tire or a portion of a green tire and performing vulcanization of the green tire or the portion of a green tire at a temperature of at least 120° C. and for a time of at least 20 minutes in presence of the second tread molding element.

Example

A first tread molding element was manufactured by 3D printing using a PETG filament of a diameter size 1.75. The extrusion temperature was about 242° C., and the bed temperature was 90° C. The first layer size was 0.2 mm, and the further layer size was 0.15 mm. The 3D printer was a Prusa MK3s and the software was Prusaslicer software.

Figure 4:
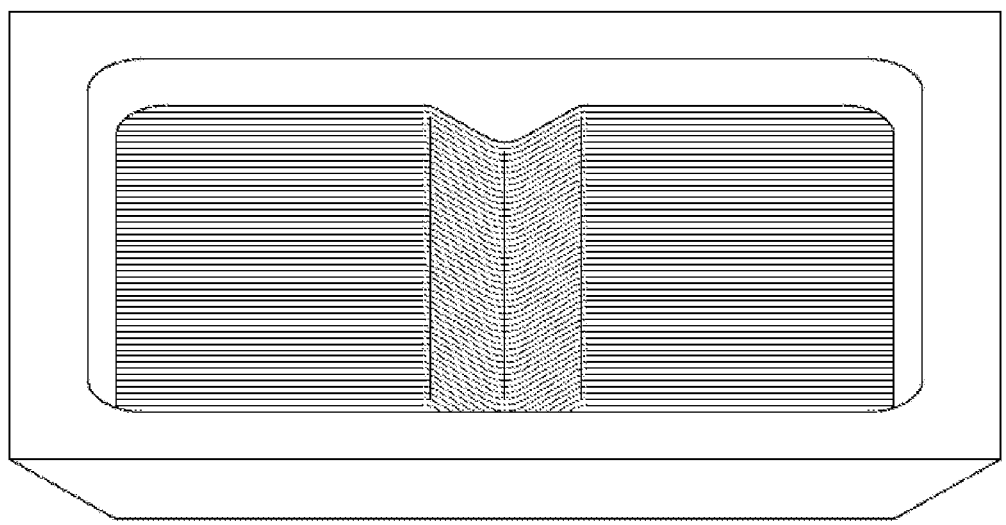
FIG. 4 is a picture of an example of a reverse mold produced according to the process of the disclosure.

A reverse mold was made from a silicone elastomer being Mold Star™ 20T from Smooth-On. The cure time for this silicone is 24 hours at room temperature. The reverse mold is shown in FIG. 4.

Figure 5:
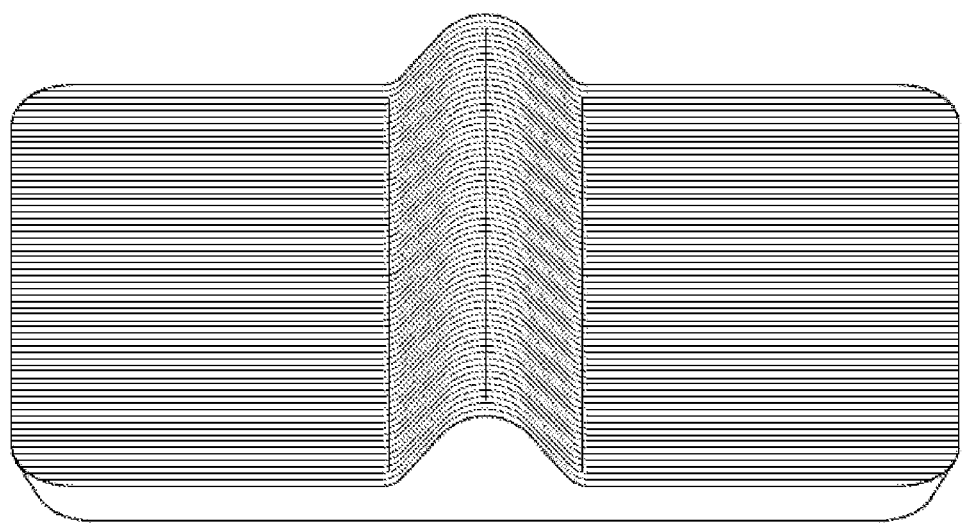
FIG. 5 is a picture of an example of a second tread molding element produced according to the process of the disclosure.

Then a second tread molding element was casted from the reverse mold. The second thread molding element was 832 HT from MG Chemicals. This epoxy is a high temperature epoxy with a constant service temperature ranging from −40 to 225° C., with a tensile strength of 48 $N/mm^2$ that can withstand the vulcanization processes of sample curing. Thus, a portion of a tire was successfully molded using the second tread molding element. The casted tread molding element is shown in FIG. 5.

In addition to material testing, the process was experimented with to obtain the fine geometries. The conditions that generated the fine geometries were heating the reverse mold to 65° C. and pouring epoxy into the mold, followed by allowing the epoxy to cure at room temperature overnight. Other processes had failed to either fill the mold completely, even with degassing, or led to warped parts.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A process for manufacturing a tread molding element configured to mold at least a portion of a tire tread, the process comprising the following successive steps of:
    providing a first tread molding element;
    forming a reverse mold of the first tread molding element, wherein the reverse mold is made of a plastic composition B comprising one or more elastomers; and
    casting a second tread molding element from the reverse mold to obtain a second tread molding element; wherein the second tread molding element is made from a plastic composition C comprising one or more thermosetting resins.

2. The process according to claim 1, wherein the step of providing a first tread molding element comprises the following sub-steps:
    modeling a three-dimensional shape of a tread molding element through a modeling program;
    providing a plastic composition A comprising one or more polymers;
    forming a first tread molding element by 3D printing from the plastic composition A based on the modelled three-dimensional shape of the tread molding element; and
    providing the first tread molding element.

3. The process of claim 1, wherein the step of providing a first tread molding element comprises the following sub-steps:
    providing a tire or a part of a tire having a tread portion;
    forming a replica mold of the tread portion of the tire or the part of a tire, wherein the replica mold is made of a plastic composition B comprising one or more elastomers wherein the replica mold is the first tread molding element; and
    providing the first tread molding element.

4. The process according to claim 3, wherein the tire or the part of a tire having a tread portion is produced by 3D-printing so that the step of providing a tire or a part of a tire having a tread portion comprises the following sub-steps modeling a three-dimensional shape of a tire or a part of a tire having a tread portion through a modeling program;

providing a plastic composition A comprising one or more polymers;

forming a tire or a part of a tire having a tread portion by 3D printing from the plastic composition A based on the modelled three-dimensional shape of a tire or a part of a tire having a tread portion; and providing the tire or the part of a tire having a tread portion.

5. The process according to claim 2, wherein the plastic composition A is or comprises one or more polymers selected from the group comprising polyoxymethylene, acrylonitrile butadiene styrene, polyamide, polyether ether ketone, cellulose acetate, cellulose acetate propionate, polylactic acid, polyethylene terephthalate, polyethylene terephthalate glycol, polymethylmethacrylate, polypropylene, polystyrene, polyvinyl chloride, polychloroethene, polyester resin, polycarbonate, thermoplastic polyurethane, polyether sulfone, poly(vinyl alcohol), polyphenyl sulfone and polyetherimide.

6. The process according to claim 1, wherein the plastic composition B is or comprises a curable elastomer composition selected from an addition reaction type polymer composition, a room-temperature-vulcanizing polymer composition, a UV-curable polymer composition or a thermoplastic-curable polymer composition.

7. The process according to claim 6 wherein the plastic composition B is or comprises polydimethylsiloxane.

8. The process according to claim 7 wherein the plastic composition B has an initial mixed viscosity at 25° C. that is less than or equal to 20 Pa·s; the initial mixed viscosity at 25° C. is determined according to ASTM D2393-86.

9. The process according to claim 1, wherein the one or more thermosetting resins in the polymer plastic composition C are selected from polyoxybenzylmethylenglycolanhydride resins, polyepoxide resins, polybenzoxazine resins, polyimide resins and cyanate ester resins.

10. The process according to claim 1, wherein the one or more thermosetting resins in the polymer plastic composition C are selected to have, in the uncured state, a viscosity ranging from 5 to 35 Pa·s as determined by a Brookfield viscometer at 100 rpm with spindle RV S07 at 25° C.

11. The process according to claim 1 further comprising a step of heating the reverse mold to a temperature comprised between 60° C. and 150° C. before the step of casting a second tread molding element from the reverse mold.

12. A process for manufacturing a tread molding element configured to mold at least a portion of a tire tread, the process comprising the following successive steps:

providing a first tread molding element that is a 3D-printed element made of a plastic composition A;

forming a reverse mold of the first tread molding element, wherein the reverse mold is made of a plastic composition B comprising one or more elastomers;

heating the reverse mold to a temperature above 50° C.; and casting a second tread molding element from the reverse mold to obtain a second tread molding element; wherein the second tread molding element is made from a plastic composition C comprising one or more thermosetting resins.

13. The process according to claim 12, wherein the plastic composition A is or comprises one or more polymers selected from polyamide, acrylonitrile butadiene styrene, polylactic acid, polyethylene terephthalate, poly(vinyl alcohol), polyethylene terephthalate glycol, thermoplastic polyurethane and polycarbonate.

14. The process according to claim 12, wherein one or more polymers of the plastic composition A have a melting point below 180° C. as determined according to ISO 3146: 2000.

15. The process according to claim 12, wherein the plastic composition B is or comprises a silicone resin composition selected from an addition reaction type silicone resin composition comprising two or more organopolysiloxanes, an addition reaction catalyst and an optional organohydrogenpolysiloxane.

16. The process according to claim 12, wherein the plastic composition C is or comprises polyepoxide resins.

17. The process according to claim 12, wherein the plastic composition C is a composite comprising one or more thermosetting resins and one or more reinforcing materials selected from carbon fibers and glass fibers.

18. The process according to claim 11, wherein the plastic composition C has a tensile strength of at least 35 N/mm$^2$ according to ASTM D 638.

19. A method for manufacturing a tire or a section of a tire; the method comprising providing one or more tread molding elements made from the process according to claim 1 and molding a tire or a portion of a tire using the one or more tread molding elements.

20. The method according to claim 19, wherein molding a tire or a portion of a tire using the one or more tread molding elements comprises providing a green tire or a portion of a green tire and performing vulcanization of the green tire or the portion of a green tire at a temperature of at least 120° C. and for a time of at least 20 minutes in presence of the one or more tread molding elements.

* * * * *